Patented Mar. 6, 1928.

1,661,731

UNITED STATES PATENT OFFICE.

ARCHIBALD F. MESTON, OF POUGHKEEPSIE, NEW YORK, ASSIGNOR TO THE DE LAVAL SEPARATOR COMPANY, OF NEW YORK, N. Y., A CORPORATION OF NEW JERSEY.

PROCESS FOR RECLAIMING USED LUBRICATING AND INSULATING OILS.

No Drawing. Application filed March 23, 1925. Serial No. 17,801.

The object of my invention is to provide a process for purifying used lubricating and insulating oils, especially turbine, transformer and switch oils. These oils ordinarily contain finely divided solid carbon, water, sludge and organic acids. I will describe one method of carrying out the process that I have applied successfully to the treatment of dirty switch oil.

The dirty oil should be heated to a temperature of from 150° F. to 200° F. (preferably from 170° F. to 190° F.) and thoroughly mixed with a solution in water of trisodium phosphate. I have found that 2 to 5% by volume of a solution having a density about 10° Baumé at 100° F. gives good results. A solution of this strength is made by dissolving about 15 parts of the salt in 100 parts of water by weight.

After agitation, the oil should be cooled slowly (2 hours or more) down to a temperature of 120° to 140° F. It will then be found that a large part of the water solution, dirt, and soaps will settle to the bottom and may be drawn off. The partially cleaned oil should then be run through a centrifugal oil purifier (a machine of the type disclosed in the Snyder Patent No. 1,283,343 is suitable for this process) to remove most of the remaining dirt, water and soaps.

The centrifuged oil is then thoroughly agitated with about one to four per cent of activated earth, allowed to settle for five to ten hours, to remove most of the earth, and then passed through the same centrifugal as before to remove the remaining earth, soap and moisture.

A very efficient activated earth is made from montmorillonite (a kind of bentonite, found in central California) which is finely ground, treated with a mineral acid (preferably sulphuric acid) and dried. Such earth has to a remarkable degree the property of removing moisture, coloring matter and other impurities from oils. One preparation of such earth is sold under the trade name of "Filtrol". Fuller's earth and certain other earths, which have this same property to a lesser degree, may be used, but with less efficiency. In fact, any of the known inert clarifying and purifying agents for treating oil may be (less preferably) substituted for the activated earths specified. It is also possible to treat the oil with such clarifying and purifying agents in other known ways (as by percolation) than by passing the mixture through a centrifuge; but removal of such agent by centrifugation presents distinct advantages in the present process.

After many trials with various neutralizing substances, I have found trisodium phosphate ($Na_3PO_4.12H_2O$) possesses properties which make it especially applicable to petroleum oil purification. Petroleum oils which have been in use, especially when exposed to air and high temperatures, contain organic substances which have the properties of acids. It is desirable when purifying such oils to neutralize these acids. When a caustic solution is added to an oil containing acids, a tight emulsion almost always results, considerable of the oil being dispersed throughout the water solution in very fine subdivision. I find, however, that when trisodium phosphate is used, the emulsion is resolved comparatively quickly by settling or centrifuging. Another reason for using a solution of trisodium phosphate is that it acts as a detergent and is effective in agglomerating the suspended carbon in switch oil and the like, causing it to agglomerate and settle. A further advantage is the fact that a solution of the strength needed is not difficult to handle, does not injure the hands except on long exposure, and is not costly.

The principal advantage, however, of the trisodium phosphate solution is that it is especially effective in preparing the oil for subsequent treatment with a purifying earth. The commonly known and used purifying earths do not remove organic acids. If, however, the acids are neutralized by means of an ordinary alkaline solution, the result of such emulsion is liable to be a tight emulsion, as above stated. If the neutralized oil contains any appreciable amount of soaps or soapy water, a large amount of earth will be required, because none of the earth will act by polymerization or absorption to remove coloring matter, or the like, until all the soap and water have been taken care of. When, however, preparatory to the earth treatment, the oil is treated with trisodium phosphate, as described, the oil is neutralized and prepared for the earth treatment without causing a tight emulsion. Most of the soapy water, or the like, can be removed by settling and centrifuging, leaving only a very small amount to be removed by the earth.

Some oils upon prolonged vigorous agitation with a trisodium phosphate solution, especially oils which contain much sludge and other impurities, make an emulsion which is not readily broken. In such cases, it is often advantageous to leave the trisodium phosphate solution in the oil for but a short time. By centrifugation, the phosphate solution, together with solid impurities, is separated from the oil. The oil and solution are separately discharged, a large part of the solids being retained in the bowl of the centrifuge. The trisodium phosphate solution is returned to the oil and agitated vigorously for the purpose of bringing about a more complete neutralization and for agglomerating or salting out the soaps formed. If the trisodium phosphate solution removed from the oil by the centrifuge after the first wash is too weak for subsequent washing operations, it may be strengthened by the addition of more trisodium phosphate, or if it be so contaminated as to be unfit for re-use, new solution may be used. Following this treatment (preferably after cooling to 120-140° F.), the oil is again centrifuged. If examination after cooling discloses the fact that the oil has responded incompletely to the trisodium phosphate treatment, it may, because of the comparatively small content of impurities, be retreated and centrifuged without re-heating.

An example of a switch oil that has been successfully treated by this process is one containing about 1% by volume of solid carbon and having an acidity requiring .5 mg. of potassium hydroxid for neutralization of 1 gram of oil. The purified product is a beautifully brilliant oil having no sediment, having an acidity requiring .02 mg. of postassium hydroxid for neutralization, a demulsibility (Herschel) of 1620 and a R. E. value of 40 seconds. "R. E." is a known abbreviation for "resistance to emulsification", as indicated by the time required for gravity separation of an oil and water mixture under standard conditions, as specified by the American "Society for Testing Materials."

What I claim is:

1. The process of purifying lubricating and insulating oils containing sludge, carbon, moisture and acid bodies, which comprises mixing the oil with a solution of trisodium phosphate, separating partially purified oil from the trisodium phosphate solution, carbon, sludge and soaps, mixing the oil with more than one and less than four per cent activated earth, and centrifuging the oil to remove suspended earth and other impurities.

2. The process of reclaiming used oil, which comprises mixing the oil with a solution of trisodium phosphate, centrifuging to remove the trisodium phosphate solution and agglomerated impurities, mixing the partially purified oil with more than one and less than four per cent of activated earth, and again centrifuging to remove earth, water and other impurities.

3. The process of reclaiming used oil, which comprises heating the oil to a temperature of from 150° F. to 200° F. and mixing same with a solution of trisodium phosphate, and subjecting the oil to a plurality of operations each of which comprises centrifuging to separate oil from the trisodium phosphate solution and agglomerated impurities, and after one of said separating operations and before another of said separating operations cooling the oil to a temperature of from 120° F. to 140° F.

4. The process of reclaiming used oil, which comprises heating the oil to a temperature of from 150° F. to 200° F. and mixing with a solution of trisodium phosphate, subjecting the oil to a plurality of operations each of which comprises centrifuging to separate oil from the trisodium phosphate solution and agglomerated impurities, and after one and before another of said separating operations cooling the oil to a temperature of from 120° F. to 140° F. and then mixing the oil with more than one and less than four per cent activated earth and centrifuging the oil to remove suspended earth and impurities that have not been removed in the preceding operations.

5. The process of purifying lubricating and insulating oils containing sludge, carbon, moisture and acid bodies, which comprises mixing the oil with a solution of trisodium phosphate at a temperature between 150° and 200° F., centrifuging at such temperature to remove the trisodium phosphate solution, carbon, sludge and soaps that are not oil-soluble, mixing the oil with the same trisodium phosphate solution from which the carbon and sludge have been centrifugally removed, cooling to 120°-140° F., again centrifuging to remove the trisodium phosphate solution and additional soaps and impurities, and treating the oil with a clarifying and purifying agent.

In testimony of which invention, I have hereunto set my hand, at Poughkeepsie, New York, on this sixteenth day of March, 1925.

ARCHIBALD F. MESTON.